(12) United States Patent
Farag et al.

(10) Patent No.: US 7,490,619 B2
(45) Date of Patent: Feb. 17, 2009

(54) FAUCET ASSEMBLY HAVING A HANDLE SUBASSEMBLY

(75) Inventors: Hanna Osama Farag, Riverside, CA (US); Scott Calvin Baker, Mission Viejo, CA (US); Evan Alan Benstead, Los Angeles, CA (US)

(73) Assignee: Newfrey, LLC, Newark, DE (US)

( * ) Notice: Subject to any disclaimer, the term of this patent is extended or adjusted under 35 U.S.C. 154(b) by 196 days.

(21) Appl. No.: 11/316,274

(22) Filed: Dec. 22, 2005

(65) Prior Publication Data

US 2007/0144583 A1    Jun. 28, 2007

(51) Int. Cl.
*F16K 43/00*    (2006.01)
(52) U.S. Cl. ............................ 137/15.01; 137/315.01; 137/359
(58) Field of Classification Search ............ 137/315.01, 137/15.01, 359, 801, 315.12, 315.15
See application file for complete search history.

(56) References Cited

U.S. PATENT DOCUMENTS

| 6,807,983 B1 * | 10/2004 | Erickson | 137/359 |
| 7,055,545 B2 * | 6/2006 | Mascari et al. | 137/359 |
| 7,066,204 B2 * | 6/2006 | Marty | 137/625.11 |

* cited by examiner

*Primary Examiner*—Kevin L Lee
(74) *Attorney, Agent, or Firm*—Richard J. Veltman, Esq.; Taylor & Aust, P.C.; Ronald K. Aust, Esq.

(57) ABSTRACT

A faucet assembly includes a valve subassembly having a valve mechanism and an actuator having an axis. An underbody includes a valve end body for receiving the valve subassembly for connection thereto. A deck plate is configured for coupling to the underbody. A handle adapter is coupled to said faucet assembly to be non-rotatable with respect to the deck plate. A handle subassembly has a hub and a valve operator. The valve operator is rotatably coupled to the hub. The valve operator is connected to the actuator of the valve subassembly to operate the valve subassembly when the valve operator is rotated about the axis to move in relation to the deck plate. The hub is attached to the deck plate via the handle adapter.

24 Claims, 4 Drawing Sheets

FAUCET ASSEMBLY HAVING A HANDLE SUBASSEMBLY

BACKGROUND OF THE INVENTION

1. Field of the Invention

The present invention relates to a faucet assembly, and, more particularly, to a faucet assembly having a handle subassembly.

2. Description of the Related Art

A faucet assembly typically includes a spout and a pair of valve operators. The valve operators are connected to respective hot and cold water valves, and in turn operate the valves by rotation of the valve operators.

SUMMARY OF THE INVENTION

The invention, in one exemplary form, is directed to a faucet assembly. The faucet assembly includes a valve subassembly. The valve subassembly includes a valve mechanism and an actuator having an axis. The actuator is coupled to the valve mechanism to operate the valve mechanism when the actuator is rotated about the axis. An underbody includes a valve end body for receiving the valve subassembly for connection thereto. A deck plate is configured for coupling to the underbody. The deck plate includes a valve opening. A handle adapter is coupled to the faucet assembly to be non-rotatable with respect to the deck plate. A handle subassembly has a hub and a valve operator. The valve operator is rotatably coupled to the hub. The valve operator is connected to the actuator of the valve subassembly to operate the valve subassembly when the valve operator is rotated about the axis to move in relation to the deck plate. The hub is attached to the deck plate via the handle adapter such that the hub is held stationary with respect to the deck plate during operation of the valve operator.

The invention, in another exemplary form, is directed to a faucet assembly. The faucet assembly includes a valve body subassembly including an underbody configured to receive a plurality of valve subassemblies. Each valve subassembly of the plurality of valve subassemblies includes a valve mechanism and an actuator coupled to the valve mechanism for operating the valve mechanism when the actuator is rotated about a corresponding axis. A deck plate subassembly is attached to the valve body subassembly. The deck plate subassembly includes a deck plate, and a plurality of handle adapters is coupled to the faucet assembly to be non-rotatable with respect to the deck plate and the corresponding axis. Each handle adapter of the plurality of handle adapters has an access opening to permit access to a corresponding valve subassembly of the plurality of valve subassemblies. Each handle subassembly of a plurality of handle subassemblies has a hub and a corresponding valve operator. Each corresponding valve operator is rotatably coupled to the hub. Each valve operator of the plurality of handle subassemblies is coupled to a corresponding actuator of the valve body subassembly to operate a corresponding valve subassembly of the plurality of valve subassemblies by rotating the corresponding actuator about the corresponding axis. Each hub of the plurality of handle subassemblies is connected to a corresponding handle adapter of the deck plate subassembly so as to be held stationary with respect to the deck plate during rotation of the corresponding valve operator about the corresponding axis to operate the corresponding actuator.

The invention, in another exemplary form, is directed to a method of assembling a faucet assembly. The method includes forming a valve body subassembly including an underbody configured to receive at least one valve subassembly, each valve subassembly including a valve mechanism and an actuator having an axis, the actuator being coupled to the valve mechanism to operate the valve mechanism when the actuator is rotated about the axis; forming a deck plate assembly including a deck plate having at least one valve opening, each valve opening in the deck plate being positioned to accommodate a corresponding valve subassembly; coupling at least one handle adapter to the faucet assembly to be non-rotatable with respect to the deck plate and the axis; forming at least one handle subassembly, each the handle subassembly having a hub and a valve operator mechanism, the valve operator mechanism being rotatably coupled to the hub; connecting each valve operator with a corresponding actuator of the corresponding valve subassembly to operate the corresponding valve subassembly by rotating the corresponding actuator about the axis; and connecting each hub to a corresponding handle adapter so that each hub is held stationary with respect to the deck plate during rotation of a corresponding valve operator about the axis.

The invention, in still another exemplary form, is directed to a faucet assembly. The faucet assembly includes a valve subassembly and an underbody. The underbody includes a valve end body for receiving the valve subassembly for connection thereto. A deck plate is configured for coupling to the underbody. The deck plate includes a non-rotatable handle adapter. A handle subassembly has a hub and a valve operator. The hub is attached to the deck plate via the non-rotatable handle adapter such that the hub is held stationary with respect to the deck plate during operation of the valve operator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
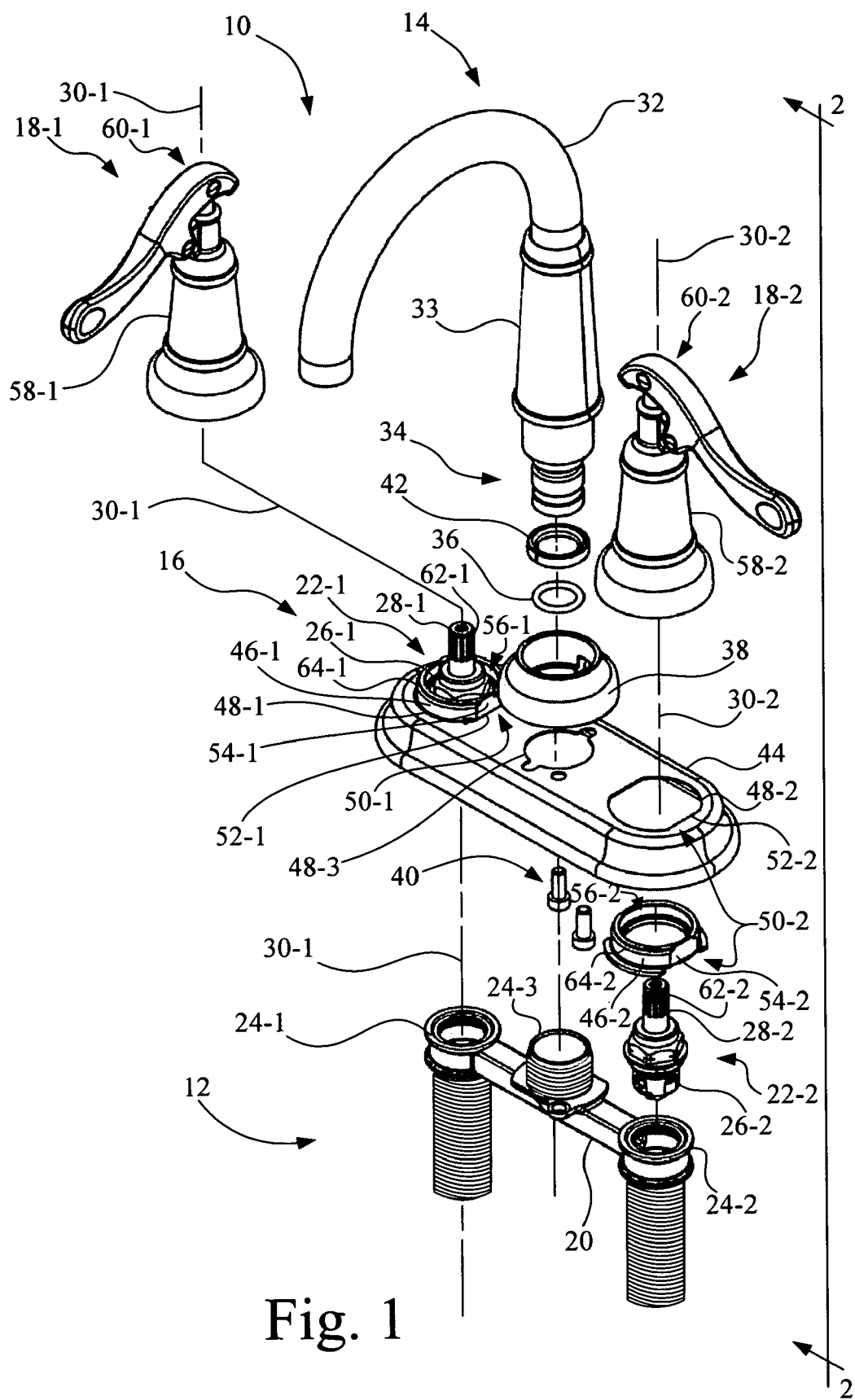
FIG. 1 is an exploded view of a faucet assembly configured according to an embodiment of the present invention.
Figure 2:
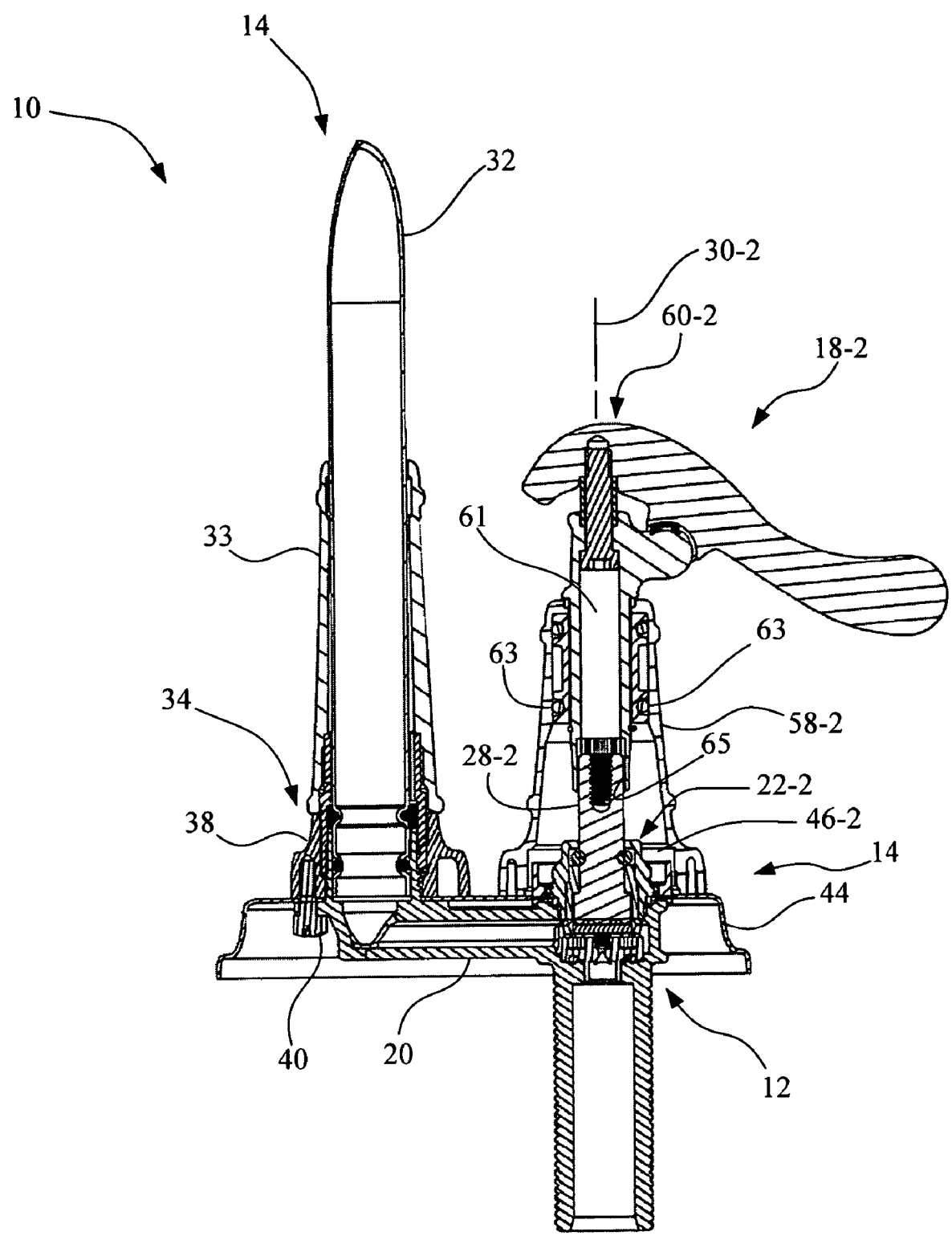
FIG. 2 is an assembled sectional view of the faucet assembly of FIG. 1.

Referring now to the drawings of FIGS. 1 and 2, there is shown a faucet assembly 10 configured in accordance with an embodiment of the present invention. Faucet assembly 10 includes a valve body subassembly 12, a spout subassembly 14, a deck plate subassembly 16, a handle subassembly 18-1, and a handle subassembly 18-2.

Valve body subassembly 12 includes an underbody 20, a valve subassembly 22-1 and a valve subassembly 22-2. Underbody 20 includes a valve end body 24-1 configured to attachably receive valve subassembly 22-1, includes a valve end body 24-2 configured to attachably receive valve subassembly 22-2, and includes a spout receptacle 24-3 for coupling to spout subassembly 14. For example, each of valve end bodies 24-1, 24-2 may-have internal threads and each valve subassemblies 22-1, 22-2 may have external threads for engaging the external threads of valve end bodies 24-1, 24-2, respectively, to accommodate the fastening of valve subassemblies 22-1, 22-2 to underbody 20.

Valve subassembly 22-1 includes a valve mechanism 26-1 and an actuator 28-1 coupled to valve mechanism 26-1 to operate valve mechanism 26-1 when actuator 28-1 is rotated about a corresponding axis 30-1. Valve mechanism 26-1 is configured to provide a variable fluid flow from closed to full open, depending on the rotational position of actuator 28-1 about axis 30-1. The rotational range of motion of actuator 28-1 from closed to full open may be, for example, a rotation around axis 30-1 of about 90 degrees.

Valve subassembly 22-2 includes a valve mechanism 26-2 and an actuator 28-2 coupled to valve mechanism 26-2 to operate valve mechanism 26-2 when actuator 28-2 is rotated about a corresponding axis 30-2. Valve mechanism 26-2 is configured to provide a variable fluid flow from closed to full open, depending on the rotational position of actuator 28-2 about axis 30-2. The rotational range of motion of actuator 28-2 from closed to full open may be, for example, a rotation around axis 30-2 of about 90 degrees.

Spout subassembly 14 includes a spout 32 and a spout nut 33. Spout 32 has a distal end 34 which, in combination with an O-ring 36, is received for rotatable coupling to spout receptacle 24-3 of underbody 20. Spout subassembly 14 further includes a mounting collar 38 that is configured to be fixedly attached to underbody 20 via a set of fasteners, e.g., screws, 40. Spout 32 is rotatably coupled to spout nut 33 via a retainer clip 42. Spout nut 33 is then threaded onto underbody 20 at spout receptacle 24-3 to secure spout 32 to underbody 20. Alternatively, for example, spout nut 33 may be threaded into mounting collar 38.

Deck plate subassembly 16 includes a deck plate 44, a handle adapter 46-1 and a handle adapter 46-2. Deck plate 44 also may be referred to in the art as an escutcheon. Deck plate 44 has a valve opening 48-1, a valve opening 48-2 and a spout opening 48-3. Valve opening 48-1 is located in deck plate 44 such that axis 30-1 of valve subassembly 22-1 passes through valve opening 48-1 when deck plate 44 is in its desired position with respect to valve body subassembly 12. Likewise, valve opening 48-2 is located such that axis 30-2 of valve subassembly 22-2 passes through valve opening 48-2 when deck plate 44 is in its desired position with respect to valve body subassembly 12.

Handle adapter 46-1 and deck plate 44 may be configured to form an anti-rotation device 50-1 to prevent rotation of handle adapter 46-1 with respect to deck plate 44 about axis 30-1. Thus, handle adapter 46-1 is coupled to deck plate 44 to be non-rotatable with respect to deck plate 44 and corresponding axis 30-1. Anti-rotation device 50-1 may be implemented, for example, as a pair of mating flats 52-1, 54-1 formed at valve opening 48-1 and on an exterior surface of handle adapter 46-1, respectively. Handle adapter 46-1 has an access opening 56-1 to permit access to corresponding valve subassembly 22-1.

Likewise, handle adapter 46-2 and deck plate 44 may be configured to form an anti-rotation device 50-2 to prevent rotation of handle adapter 46-2 with respect to deck plate 44 about axis 30-2. Thus, handle adapter 46-2 is coupled to deck plate 44 to be non-rotatable with respect to deck plate 44 and corresponding axis 30-2. Anti-rotation device 50-2 may be implemented, for example, as a pair of mating flats 52-2, 54-2 formed at valve opening 48-2 and on an exterior surface of handle adapter 46-2, respectively. Handle adapter 46-2 has an access opening 56-2 to permit access to corresponding valve subassembly 22-2.

Those skilled in the art will recognize that anti-rotation devices 50-1, 50-2 may be implemented in other forms, such as for example, as a key and slot arrangement. Also, alternatively, deck plate 44 and handle adapters 46-1, 46-2 may be formed as a unitary structure, such as during a molding or forging process, or permanently attached by welds or adhesive.

Figure 3:
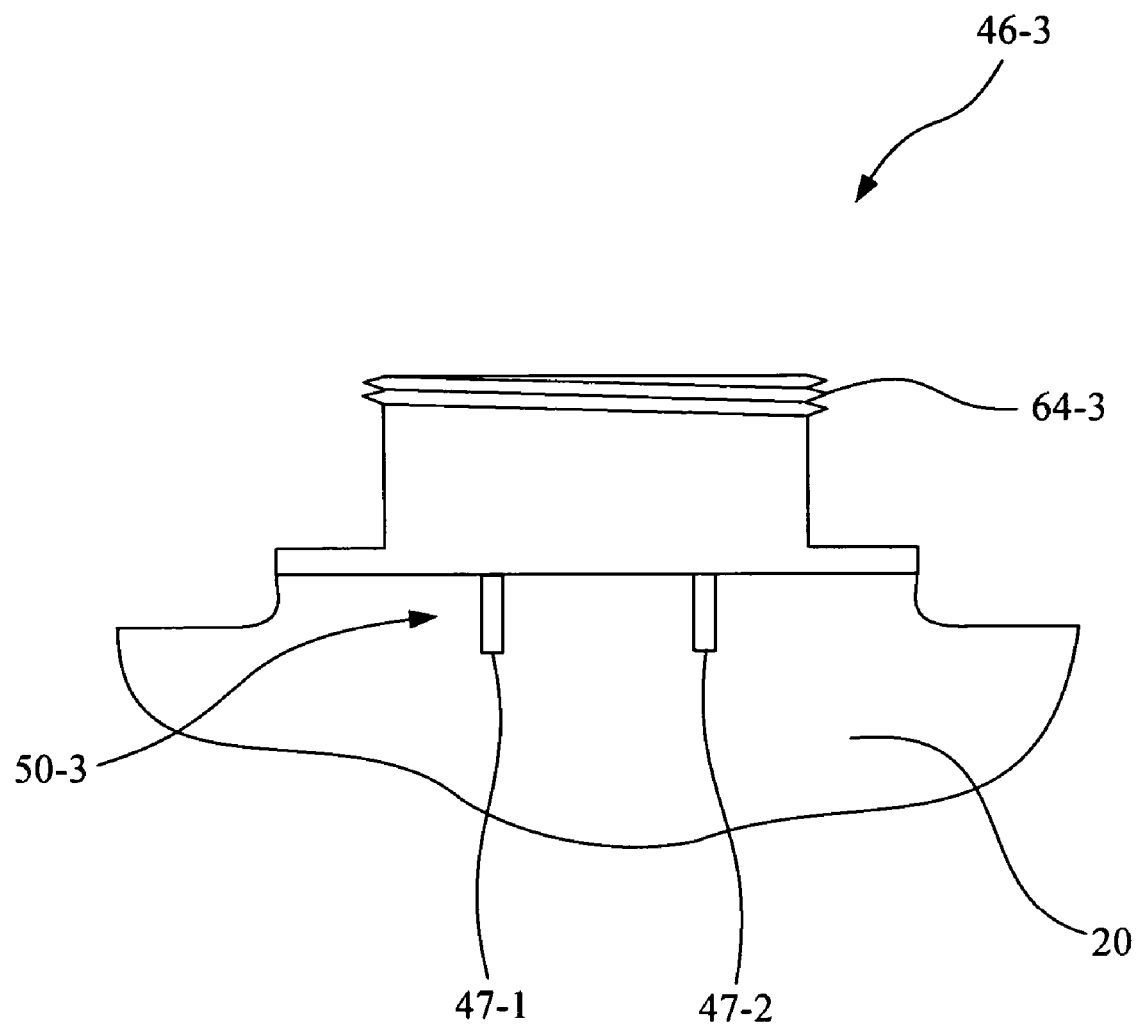
FIG. 3 is a side view of an alternative embodiment of a handle adapter for use with the faucet assembly of FIG. 1.

As a further alternative, as shown in FIG. 3, a handle adapter 46-3 has external threads 64-3, and is configured to be a suitable replacement for handle adapter 46-1 and/or handle adapter 46-2. Handle adapter 46-3 together with underbody 20 form an anti-rotation device 50-3 to effect an engagement of valve handle adapter 46-3 with underbody 20 to prevent rotation of handle adapter 46-3 with respect to deck plate 44. For example, as shown in the embodiment of FIG. 3, handle adapter 46-3 may include one or more prongs 47-1 and 47-2 that engage underbody 20 to prevent rotation of handle adapter 46-3 with respect to deck plate 44 about an axis, e.g., one of axis 30-1 or axis 30-2. Alternatively, the prong(s) 47-1, 47-2 may be formed on underbody 20 to engage corresponding recesses in handle adapter 46-3. During assembly, handle adapter 46-3 would be trapped between deck plate 44 and underbody 20.

Again referring to FIGS. 1 and 2, deck plate subassembly 16 is attached to valve body subassembly 12 via the set of fasteners 40, with deck plate 44 being interposed between mounting collar 38 of spout subassembly 14 and underbody 20 of valve body subassembly 12. The set of fasteners 40 pass through corresponding holes in underbody 20 and deck plate 44, and thread into holes in mounting collar 38.

Handle subassembly 18-1 has a hub 58-1 and a valve operator 60-1. Valve operator 60-1 is rotatably coupled to hub 58-1, such that valve operator 60-1 is free to rotate when hub 58-1 is held stationary. Likewise, handle subassembly 18-2 has a hub 58-2 and a valve operator 60-2. Valve operator 60-2 is rotatably coupled to hub 58-2, such that valve operator 60-2 is free to rotate when hub 58-2 is held stationary.

As shown in FIG. 2, for example, with respect to handle subassembly 18-2, in order to rotatably couple valve operator 60-2 to hub 58-2, valve operator 60-2 may include a stem 61 that is inserted into hub 58-2, and configured to receive a retaining ring 63 to limit axial motion of valve operator 60-2 with respect to hub 58-2 and axis 30-2, while permitting rotational motion of valve operator 60-2 with respect to hub 58-2 about axis 30-2. Handle subassembly 18-1 may be configured similar to handle subassembly 18-2.

Referring again to FIG. 1, valve operator 60-1 includes an opening with internal splines (not shown) that engage external splines 62-1 of actuator 28-1 of valve subassembly 22-1 so as to connect valve operator 60-1 with actuator 28-1. Hub 58-1 is connected to handle adapter 46-1 in a manner so as to be held stationary with respect to deck plate 44 during operation of valve operator 60-1. In one embodiment, for example, hub 58-1 of handle subassembly 18-1 may have internal threads and handle adapter 46-1 may have external threads 64-1 configured to engage the internal threads of hub 58-1, wherein during assembly of faucet assembly 10, hub 58-1 is threaded onto handle adapter 46-1 and fastened tightly via engagement of the internal threads of hub 58-1 with the external threads 64-1 of handle adapter 46-1.

Accordingly, during operation, valve operator 60-1 may be rotated about axis 30-1, i.e., moving in relation to deck plate 44, which correspondingly rotates actuator 28-1 to operate valve mechanism 26-1 of valve subassembly 22-1, while hub 58-1 is held stationary with respect to deck plate 44 by the engagement of hub 58-1 with handle adapter 46-1.

Likewise, valve operator 60-2 includes an opening with internal splines 65 (see FIG. 2) that engage external splines 62-2 of actuator 28-2 of valve subassembly 22-2 so as to connect valve operator 60-2 with actuator 28-2. Hub 58-2 is connected to handle adapter 46-2 in a manner so as to be held stationary with respect to deck plate 44 during operation of valve operator 60-2. In one embodiment, for example, hub 58-2 of handle subassembly 18-2 may have internal threads and handle adapter 46-2 may have external threads 64-2 configured to engage the internal threads of hub 58-2, wherein during assembly of faucet assembly 10, hub 58-2 is threaded onto handle adapter 46-2 and fastened tightly via engagement of the internal threads of hub 58-2 with the external threads 64-2 of handle adapter 46-2.

Accordingly, during operation, valve operator 60-2 may be rotated about axis 30-2, i.e., moving in relation to deck plate 44, which correspondingly rotates actuator 28-2 to operate valve mechanism 26-2 of valve subassembly 22-2, while hub 58-2 is held stationary with respect to deck plate 44 by the engagement of hub 58-2 with handle adapter 46-2.

Figure 4:
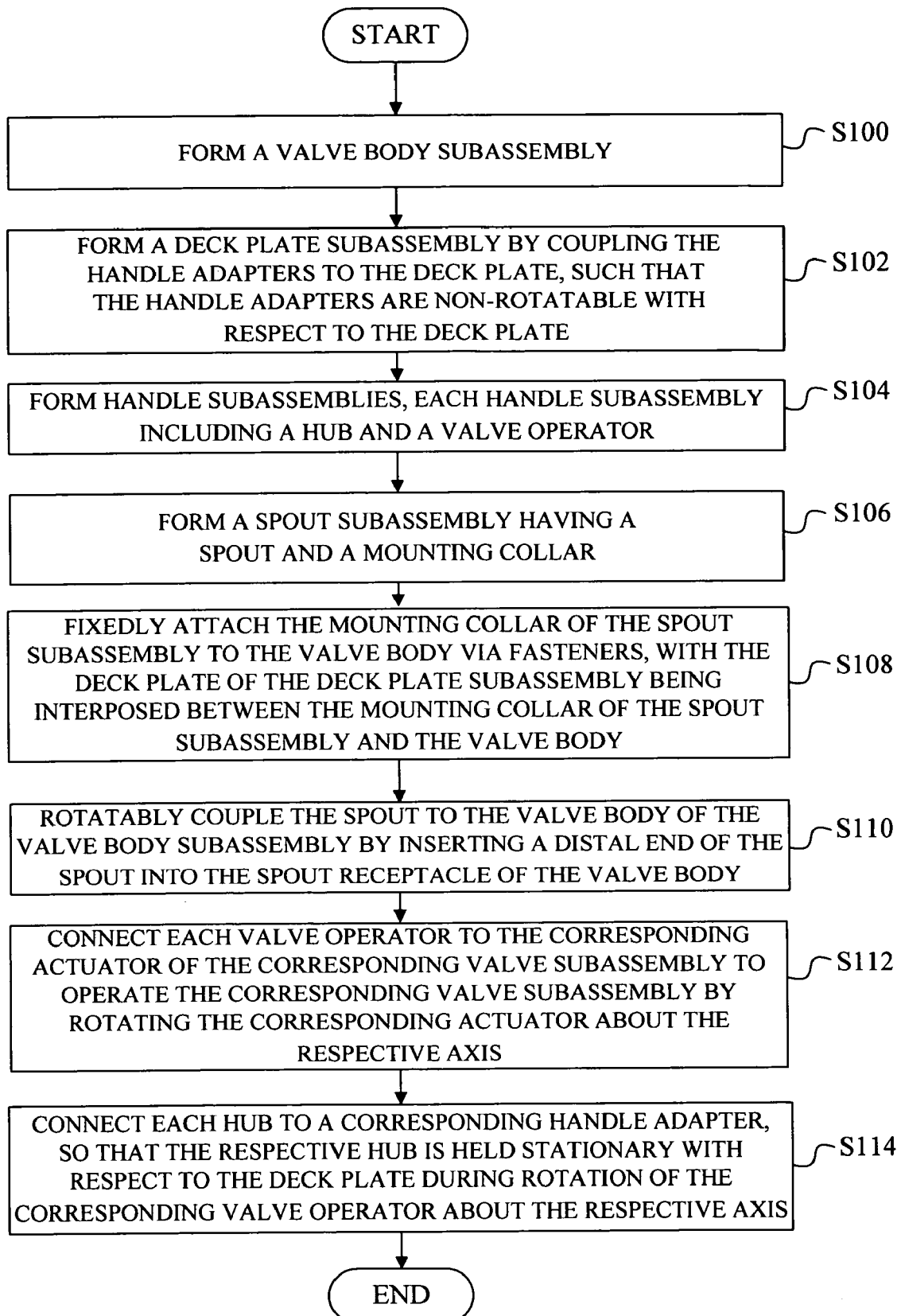
FIG. 4 is a flowchart of an exemplary method for assembling the faucet assembly of FIGS. 1 and 2.

FIG. 4 is a flowchart of an exemplary method for assembling faucet assembly 10. Those skilled in the art will recognize that the order of the steps set forth below may be varied, and the present invention is intended to cover all viable combinations of the following steps, regardless of the actual order used.

At step S100, valve body subassembly 12 is formed.

At step S102, deck plate subassembly 16 is formed by coupling handle adapters 46-1, 46-2 to deck plate 44, such that handle adapters 46-1, 46-2 are non-rotatable with respect to deck plate 44 and corresponding axes 30-1 and 30-2, respectively. Because of handle adapters 46-1, 46-2, deck plate 44 operates as a structural member as opposed to merely a decorative cover, as in conventional faucets.

At step S104, handle subassemblies 18-1, 18-2 are formed, with each handle assembly including a hub and a valve operator. For example, valve operator 60-1 is rotatably coupled to hub 58-1 of handle subassembly 18-1, such that valve operator 60-1 is free to rotate when hub 58-1 is held stationary. Likewise, valve operator 60-2 is rotatably coupled to hub 58-2 of handle subassembly 18-2, such that valve operator 60-1 is free to rotate when hub 58-2 is held stationary.

At step S106, spout subassembly 14 is formed having spout 32 and mounting collar 38.

At step S108, mounting collar 38 of spout subassembly 14 is fixedly attached to underbody 20 via fasteners 40, with deck plate 44 of deck plate subassembly 16 being interposed between mounting collar 38 of spout subassembly 14 and underbody 20. Accordingly, mounting collar 38, i.e., the spout collar, of spout subassembly 14 rigidly couples deck plate 44 to underbody 20, thereby making deck plate 44 a structural member rather than just an esthetic covering for underbody 20. Because of this structural arrangement, handle hubs 58-1, 58-2 of handle subassemblies 18-1, 18-2 attach to deck plate 20 (by way of handle adapters 46-1, 46-2, respectively). In contrast, in conventional faucets, the handle hubs attach to the valves or valve bodies.

At step S110, spout 32 is rotatably coupled to underbody 20 by inserting distal end 34 of spout 32 into spout receptacle 24-3 of underbody 20. Spout nut 33 is then threaded onto underbody 20 at spout receptacle 24-3 to secure spout 32 to underbody 20.

At step S112, valve operator 60-1 is connected to the corresponding actuator 28-1 of the corresponding valve subassembly 22-1 to operate valve subassembly 22-1 by rotating the corresponding actuator 28-1 about axis 30-1. Likewise, valve operator 60-2 is connected to the corresponding actuator 28-2 of valve subassembly 22-2 to operate valve subassembly 22-2 by rotating the corresponding actuator 28-2 about the respective axis 30-2.

At step S114, hub 58-1 is connected to corresponding handle adapter 46-1, so that hub 58-1 is held stationary with respect to deck plate 44 during rotation of the corresponding valve operator 60-1 about axis 30-1. Likewise, hub 58-2 is connected to corresponding handle adapter 46-2, so that hub 58-2 is held stationary with respect to deck plate 44 during rotation of the corresponding valve operator 60-2 about the respective axis 30-2.

Accordingly, during operation of faucet assembly 10, valve operator 60-1 is rotated about axis 30-1, i.e., moving in relation to deck plate 44, which correspondingly rotates actuator 28-1 to operate valve mechanism 26-1 of valve subassembly 22-1, while hub 58-1 is held stationary with respect to deck plate 44 by the engagement of hub 58-1 with handle adapter 46-1. Likewise, valve operator 60-2 is rotated about axis 30-2, i.e., moving in relation to deck plate 44, which correspondingly rotates actuator 28-2 to operate valve mechanism 26-2 of valve subassembly 22-2, while hub 58-2 is held stationary with respect to deck plate 44 by the engagement of hub 58-2 with handle adapter 46-2.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A faucet assembly, comprising:
    a valve subassembly, said valve subassembly including a valve mechanism and an actuator having an axis, said actuator being coupled to said valve mechanism to operate said valve mechanism when said actuator is rotated about said axis;
    an underbody, said underbody including a valve end body for receiving said valve subassembly for connection thereto;
    a deck plate configured for coupling to said underbody, said deck plate including a valve opening;
    a handle adapter coupled to said faucet assembly to be non-rotatable with respect to said deck plate; and
    a handle subassembly having a hub and a valve operator, said valve operator being rotatably coupled to said hub, said valve operator being connected to said actuator of said valve subassembly to operate said valve subassembly when said valve operator is rotated about said axis to move in relation to said deck plate, and said hub being attached to said deck plate via said handle adapter such that said hub is held stationary with respect to said deck plate during operation of said valve operator,
    wherein said handle adapter includes an anti-rotation feature located to engage a portion of at least one of said underbody and said deck plate, said anti-rotation feature and said portion together forming an anti-rotation device to prevent rotation of said handle adapter with respect to said deck plate about said axis.

2. The faucet assembly of claim 1, further comprising:
    a spout subassembly having a spout rotatably coupled to said underbody; and a mounting collar fixedly attached to said underbody, with said deck plate being interposed between said mounting collar and said underbody.

3. The faucet assembly of claim 1, wherein said handle adapter and said deck plate are configured to form said anti-rotation device to prevent rotation of said handle adapter with respect to said deck plate about said axis.

4. The faucet assembly of claim 1, wherein said handle adapter and said underbody are configured to form said anti-rotation device to prevent rotation of said handle adapter with respect to said deck plate about said axis.

5. The faucet assembly of claim 1, wherein said handle adapter and said deck plate are formed as a unitary structure.

6. The faucet assembly of claim 1, wherein said hub of said handle subassembly has internal threads and said handle adapter has external threads configured to engage said internal threads of said hub, wherein during assembly of said faucet assembly said hub is fastened tightly to said handle adapter via engagement of said internal threads of said hub with said external threads of said handle adapter.

7. The faucet assembly of claim 1, further comprising:
a second valve subassembly, said second valve subassembly including a second valve mechanism and a second actuator having a second axis, said second actuator being coupled to said second valve mechanism to operate said second valve mechanism when said second actuator is rotated about said second axis;
said underbody including a second valve end body for receiving said second valve subassembly for connection thereto;
said deck plate including a second valve opening, said second axis of said second valve subassembly passing through said second valve opening of said deck plate;
a second handle adapter coupled to said faucet assembly to be non-rotatable with respect to said deck plate; and
a second handle subassembly having a second hub and a second valve operator, said second valve operator being rotatably coupled to said second hub,
said second valve operator being connected to said second actuator of said second valve subassembly to operate said second valve subassembly when said second valve operator is rotated about said second axis to move in relation to said deck plate, and
said second hub being attached to said deck plate via said second handle adapter such that said second hub is held stationary with respect to said deck plate during operation of said second valve operator.

8. The faucet assembly of claim 7, wherein said second handle adapter includes a portion of an anti-rotation device to prevent rotation of said second handle adapter with respect to said deck plate about said axis.

9. The faucet assembly of claim 7, wherein said second handle adapter and said deck plate are configured to form an anti-rotation device to prevent rotation of said second handle adapter with respect to said deck plate about said second axis.

10. The faucet assembly of claim 7, wherein said second handle adapter and said underbody are configured to form an anti-rotation device to prevent rotation of said second handle adapter with respect to said deck plate about said axis.

11. The faucet assembly of claim 7, wherein said second handle adapter and said deck plate are formed as a unitary structure.

12. The faucet assembly of claim 7, wherein said second hub of said second handle subassembly has second internal threads and said second handle adapter has second external threads configured to engage said second internal threads of said second hub, wherein during assembly of said faucet assembly said second hub is fastened tightly to said second handle adapter via engagement of said second internal threads of said second hub with said second external threads of said second handle adapter.

13. A faucet assembly, comprising:
a valve body subassembly including an underbody configured to receive a plurality of valve subassemblies, each valve subassembly of said plurality of valve subassemblies including a valve mechanism and an actuator coupled to said valve mechanism for operating said valve mechanism when said actuator is rotated about a corresponding axis;
a deck plate subassembly attached to said valve body subassembly, said deck plate subassembly including a deck plate;
a plurality of handle adapters coupled to said faucet assembly to be non-rotatable with respect to said deck plate and said corresponding axis, each handle adapter of said plurality of handle adapters having an access opening to permit access to a corresponding valve subassembly of said plurality of valve subassemblies; and
a plurality of handle subassemblies, each handle subassembly of said plurality of handle subassemblies having a hub and a corresponding valve operator, each said corresponding valve operator being rotatably coupled to said hub, wherein:
each said valve operator of said plurality of handle subassemblies is coupled to a corresponding actuator of said valve body subassembly to operate a corresponding valve subassembly of said plurality of valve subassemblies by rotating said corresponding actuator about said corresponding axis; and
each hub of said plurality of handle subassemblies is connected to a corresponding handle adapter of said deck plate subassembly so as to be held stationary with respect to said deck plate during rotation of said corresponding valve operator about said corresponding axis to operate said corresponding actuator,
wherein each of said plurality of handle adapters includes an anti-rotation feature located to engage a portion of at least one of said underbody and said deck plate, said anti-rotation feature and said portion together forming an anti-rotation device to prevent rotation of a corresponding handle adapter with respect to said deck plate about said corresponding axis.

14. The faucet assembly of claim 13, further comprising:
a spout subassembly having a spout rotatably coupled to said underbody; and
a mounting collar fixedly attached to said underbody, with said deck plate of said deck plate assembly being interposed between said mounting collar and said underbody of said valve body subassembly.

15. The faucet assembly of claim 13, wherein each said handle adapter and said deck plate are configured to form corresponding anti-rotation devices to prevent rotation of each handle adapter of said plurality of handle adapters with respect to said deck plate about said corresponding axis.

16. The faucet assembly of claim 13, wherein each handle adapter and said underbody are configured to form corresponding anti-rotation devices to prevent rotation of each handle adapter of said plurality of handle adapters with respect to said deck plate about said corresponding axis.

17. The faucet assembly of claim 13, wherein said plurality of handle adapters and said deck plate are formed as a unitary structure.

18. The faucet assembly of claim 13, wherein each hub of said plurality of handle subassemblies has internal threads and a corresponding handle adapter of said plurality of handle adapters has external threads configured to engage said internal threads, wherein during assembly of said faucet assembly said each hub is fastened tightly to said corresponding handle adapter via said internal threads and said external threads.

19. A method of assembling a faucet assembly, comprising:
   forming a valve body subassembly including an underbody configured to receive at least one valve subassembly, each valve subassembly including a valve mechanism and an actuator having an axis, said actuator being coupled to said valve mechanism to operate said valve mechanism when said actuator is rotated about said axis;
   forming a deck plate assembly including a deck plate having at least one valve opening, each valve opening in said deck plate being positioned to accommodate a corresponding valve subassembly;
   coupling at least one handle adapter to said faucet assembly to be non-rotatable with respect to said deck plate and said axis;
   forming at least one handle subassembly, each said handle subassembly having a hub and a valve operator mechanism, said valve operator mechanism being rotatably coupled to said hub;
   connecting each said valve operator with a corresponding actuator of said corresponding valve subassembly to operate said corresponding valve subassembly by rotating said corresponding actuator about said axis; and
   connecting each said hub to a corresponding handle adapter to attach each said hub to said deck plate so that each said hub is held stationary with respect to said deck plate during rotation of a corresponding valve operator about said,
   wherein each said handle adapter includes an anti-rotation feature located to engage a portion of at least one of said underbody and said deck plate, said anti-rotation feature and said portion together forming an anti-rotation device to prevent rotation of said each handle adapter with respect to said deck plate about said axis.

20. The method of claim 19, further comprising:
   forming a spout subassembly having a spout and a spout nut;
   fixedly attaching a mounting collar to said underbody, with said deck plate of said deck plate subassembly being interposed between said mounting collar and said underbody of said valve body subassembly; and
   rotatably coupling said spout to said underbody via said spout nut.

21. The method of claim 19, wherein each said handle adapter and said deck plate are formed as a unitary structure.

22. The method of claim 19, wherein the act of connecting each said hub to a corresponding handle adapter is performed by threading said hub onto said corresponding handle adapter until tight.

23. A faucet assembly, comprising:
   a valve subassembly, said valve subassembly including a valve mechanism and an actuator having an axis, said actuator being coupled to said valve mechanism to operate said valve mechanism when said actuator is rotated about said axis;
   an underbody, said underbody including a valve end body for receiving said valve subassembly for connection thereto;
   a deck plate configured for coupling to said underbody, said deck plate including a valve opening;
   a handle adapter coupled to said faucet assembly to be non-rotatable with respect to said deck plate;
   a handle subassembly having a hub and a valve operator, said valve operator being rotatably coupled to said hub, said valve operator being connected to said actuator of said valve subassembly to operate said valve subassembly when said valve operator is rotated about said axis to move in relation to said deck plate, and said hub being attached to said deck plate via said handle adapter such that said hub is held stationary with respect to said deck plate during operation of said valve operator; and
   anti-rotation means for preventing rotation of said handle adapter with respect to said deck plate about said axis.

24. The faucet assembly of claim 23, wherein said anti-rotation means is integrally formed with said handle adapter and at least one of said underbody and said deck plate.

* * * * *